(12) United States Patent
Ogawa et al.

(10) Patent No.: US 6,944,929 B2
(45) Date of Patent: Sep. 20, 2005

(54) METHOD OF JOINING RUBBER MAGNET TO YOKE

(75) Inventors: Noriaki Ogawa, Nagano (JP); Masato Akachi, Nagano (JP); Akihiko Ookubo, Nagano (JP); Hisashi Ueno, Nagano (JP); Takashi Miyamoto, Nagano (JP)

(73) Assignee: Sanyo Denki Co., Ltd., Tokyo (JP)

( * ) Notice: Subject to any disclaimer, the term of this patent is extended or adjusted under 35 U.S.C. 154(b) by 3 days.

(21) Appl. No.: 10/698,917

(22) Filed: Oct. 31, 2003

(65) Prior Publication Data

US 2004/0088852 A1 May 13, 2004

(30) Foreign Application Priority Data

Nov. 1, 2002 (JP) ........................................ 2002-320233

(51) Int. Cl.⁷ ........................... B23P 25/00; H02K 15/02
(52) U.S. Cl. ........................... 29/458; 29/598; 29/602.1; 29/557; 156/293; 156/218; 156/291; 310/156.21; 310/156.01; 310/156.08
(58) Field of Search ................................ 29/598, 602.1, 29/458, 557, 558, 596, 607; 156/218, 291, 293; 310/156.21, 156.01, 156.08, 43

(56) References Cited

U.S. PATENT DOCUMENTS 3,861,028 A * 1/1975 Mittag .......................... 29/598
5,675,886 A * 10/1997 Hase et al. .................. 29/602.1
2004/0189105 A1 * 9/2004 Maezawa et al. ............. 310/36
2004/0212265 A1 * 10/2004 Yeh et al. ............... 310/156.21

FOREIGN PATENT DOCUMENTS

| JP | 59096858 A | * | 6/1984 | .......... H02K/21/08 |
| JP | 05-146101 | | 6/1993 | |
| JP | 08-323863 | | 12/1996 | |

* cited by examiner

Primary Examiner—Essama Omgba
(74) Attorney, Agent, or Firm—Rankin, Hill, Porter & Clark LLP

(57) ABSTRACT

A plurality of grooves 25 are formed in an outer peripheral surface of a cylindrical rubber magnet 17. The grooves 25 extend in a direction in which the cylindrical rubber magnet 17 is inserted into a yoke 3. The grooves 25 are open on both ends in the direction of insertion and are also open outwardly in a radial direction of the cylindrical rubber magnet 17. The grooves are formed at predetermined intervals in a peripheral direction of the cylindrical rubber magnet 17. When the cylindrical rubber magnet 17 is inserted into the yoke 3, an adhesive 15 gets into the grooves 25 without being pushed out of a lower end surface 21 of the cylindrical rubber magnet 17. The adhesive located between adjacent grooves also readily gets into the grooves 25. By presence of the adhesive got into the grooves 25, a necessary and sufficient amount of the adhesive can be uniformly interposed between a peripheral wall section 11 of the yoke 3 and the cylindrical rubber magnet 17.

7 Claims, 8 Drawing Sheets

METHOD OF JOINING RUBBER MAGNET TO YOKE

BACKGROUND OF THE INVENTION

The present invention relates to a method of joining a rubber magnet to a yoke used in an electrical apparatus such as a brushless motor.

FIGS. 5A and 5B are used for explaining a conventional method of manufacturing a magnet rotor 101 of the brushless motor of an outer rotor type used as a fan motor. FIG. 5A is a top plan view of the magnet rotor 101 seen from an axial direction of a rotating shaft 105, while FIG. 5B shows a vertical section of the magnet rotor 101. FIG. 6 shows a vertical section used for explaining a manufacturing step of the magnet rotor 101.

The magnet rotor 101 is constituted from a cup-shaped yoke 103, the rotating shaft 105, and a bracket for securing the rotating shaft to the yoke 103. The cup-shaped yoke 103 is constituted from a cylindrical peripheral wall section 111 and a disc-shaped bottom wall section 112 integral with the peripheral wall section 111 so as to close an end of the peripheral wall section 111. A through hole 113 is formed at a center of the bottom wall section 112. The bracket 107 is fitted into the through hole 113 for securing the rotating shaft 105 to the yoke 103. The bracket 107 is constituted from a bracket body 108 having at its center a through hole into which the end of the rotating shaft 105 is fitted and a ring shaped flange section 109 integral with the end of the bracket body 108. An outer peripheral surface 119 of a cylindrical rubber magnet 117 is joined to an inner peripheral surface 114 of the peripheral wall section 111 of the yoke 103. The cylindrical rubber magnet 117 is formed by rolling a plate-like rubber magnet into a cylindrical shape.

The cylindrical rubber magnet 117 is joined to the inner peripheral surface 114 of the peripheral wall section 111 of the yoke 103 in a manner as described below. First, an adhesive 115 is applied to the inner peripheral surface 114 of the peripheral wall section 111 of the yoke 103. The adhesive 115 is continuously applied to a middle region of the inner peripheral surface 114 in a peripheral direction. Next, the long, thin, and plate-like rubber magnet is rolled into the cylindrical shape, thereby forming the cylindrical rubber magnet 117. Then, the cylindrical rubber magnet 117 is inserted into a predetermined position by sliding its outer peripheral surface 119 over the inner peripheral surface 114 of the peripheral wall section 111 of the yoke 103. The adhesive 115 is then cured, thereby completing the manufacturing of the magnet rotor.

Japanese, Patent Application Laid-Open Publication No. 146101/1993 discloses in its FIG. 2 a conventional technique by which a sheet-like rubber magnet is press fitted into a cylindrical frame and adhered to the frame by the adhesive.

In a conventional joining method, however, part of the adhesive 115 applied to the inner peripheral surface 114 of the yoke 103 tends to be pushed out of a lower end surface 121 of the cylindrical rubber magnet 117 to the bottom wall section 112, as shown in FIG. 6, when the cylindrical rubber magnet 117 is inserted into the yoke 103. For this reason, a necessary and sufficient amount of the adhesive fails to uniformly get into a gap between the inner peripheral surface 114 of the yoke 103 and the outer peripheral surface 119 of the cylindrical rubber magnet 117. If such a situation occurs, it becomes more likely that the rubber magnet will be partially separated from a joint surface between the yoke 103 and the cylindrical rubber magnet 117. If such a separation occurs, part of the cylindrical rubber magnet 117 is displaced inwardly in a radial direction of the rotor, and a displaced part of the cylindrical, rubber magnet 117 might come into contact with pole surfaces of a stator (not shown).

Especially when a high-performance rubber magnet such as an Nd—Fe—B based rubber magnet is employed so as to enhance performance of a motor, it becomes more likely that an adhesion layer will come off due to a strong magnetic force between the cylindrical rubber magnet 117 and the stator (not shown). Alternatively, the stronger the magnetic-force becomes, the more likely it becomes that the part of the separated cylindrical rubber magnet 117 will be displaced toward the stator and come into contact with poles of the stator, thereby causing faulty rotation of the motor due to a magnetic attraction force that acts between the separated part of the cylindrical rubber magnet 117 and the stator.

SUMMARY OF THE INVENTION

An object of the present invention is therefore to provide a method of joining a rubber magnet to a yoke, whereby a necessary and sufficient amount of adhesive can be uniformly interposed between an inner peripheral surface of a peripheral wall section of the yoke and an outer peripheral surface of the cylindrical rubber magnet.

In a method of joining a rubber magnet to a yoke, to which the present invention aims at making an improvement, an adhesive is applied to an inner peripheral surface of a cylindrical peripheral wall section of the yoke, and a plate-like rubber magnet is rolled into a cylindrical shape, thereby forming a cylindrical rubber magnet. Then, the cylindrical rubber magnet is inserted into the yoke by sliding its outer peripheral surface over the inner peripheral surface of the peripheral wall section of the yoke, thereby joining the cylindrical rubber magnet to the inner peripheral surface of the yoke. In the joining method according to the present invention, a plurality of grooves are formed in the outer peripheral surface of the cylindrical rubber magnet. These grooves extend in the outer peripheral surface in a direction in which the cylindrical rubber magnet is inserted into the yoke, and are open on both ends of the direction of insertion and are also open outwardly in a radial direction of the cylindrical rubber magnet. These grooves are formed at predetermined intervals in a peripheral direction of the cylindrical rubber magnet. With formation of these grooves, when the cylindrical rubber magnet is inserted into the yoke, the adhesive gets into the respective grooves through openings at one end of the grooves. The openings are located toward a bottom wall section of the yoke. Consequently, the above-mentioned arrangement ensures that a predetermined amount of the adhesive can be interposed between the outer peripheral surface of the cylindrical rubber magnet and the inner peripheral surface of the peripheral wall section of the yoke at locations in which the grooves are present. Thus, separation of the cylindrical rubber magnet from the inner peripheral surface of the yoke can be effectively prevented.

In order to obtain more secure joining, it is preferable that an interval between the grooves adjacent to each other and a cross sectional shape of each of the grooves are set so that the adhesive located between the adjacent grooves can readily, get into the grooves when the outer peripheral surface of the cylindrical rubber magnet is slid over the inner peripheral surface of the yoke. More specifically, it is preferable that the interval between the adjacent grooves is set in a range of 5% to 20% of a diameter of the outer peripheral surface of the cylindrical rubber magnet and that the cross sectional shape is set to a V-shape. This arrangement ensures that more adhesive applied to the inner peripheral surface of the yoke gets into the grooves when the cylindrical rubber magnet is inserted into the yoke.

In addition to the grooves, a plurality of recesses that are open outwardly in the radial direction of the cylindrical rubber magnet may be formed in the outer peripheral surface of the cylindrical rubber magnet. With this arrangement, the adhesive got into between the inner peripheral surface of the peripheral wall section of the yoke and regions with no grooves formed, on the outer peripheral surface of the cylindrical magnet, will stay in the recesses. Secure joining can thereby become possible in these regions as well.

A diameter of the outer peripheral surface of the cylindrical rubber magnet may be made smaller than the diameter of the inner peripheral surface of the yoke by a predetermined length, thereby enabling the adhesive to readily get into a gap between the cylindrical rubber magnet and the yoke. Further, by also forming only the recesses that are open outwardly in the radial direction of the cylindrical rubber magnet in the outer peripheral surface of the cylindrical rubber magnet in a dispersed state, the adhesive can also be interposed between the cylindrical rubber magnet and the peripheral wall section of the yoke in the dispersed state when the cylindrical rubber magnet is inserted into the yoke. In this case, an area of an opening of each of the grooves and the interval between the recesses adjacent to each other may be determined so that the adhesive can get into the gap between the outer peripheral surface of the cylindrical rubber magnet and the inner peripheral surface of the yoke and can get into an inside of the recesses progressively one after another. Specifically, if the area of the opening is set in a range of 0.5 $mm^2$ to 1.5 $mm^2$ and if the interval between the adjacent recesses is set in a range of 1.5 mm to 3 mm, a necessary and sufficient adhesion strength can be obtained even if the grooves are not provided in the outer peripheral surface of the cylindrical rubber magnet.

According to the present invention, a necessary and sufficient amount of the adhesive can be uniformly interposed between the inner peripheral surface of the peripheral wall section of the yoke and the outer peripheral surface of the cylindrical rubber magnet. This accordingly ensures that the predetermined amount of the adhesive can be interposed between the outer peripheral surface of the cylindrical rubber magnet and the inner peripheral surface of the peripheral wall section of the yoke at positions where a plurality of the grooves are present. Thus, separation of the cylindrical rubber magnet from the inner peripheral surface of the yoke can be effectively prevented.

Also, in a case where a plurality of the recesses are provided in the outer peripheral surface of the cylindrical rubber magnet, the predetermined amount of the adhesive can be securely interposed between the outer peripheral surface of the cylindrical rubber magnet and the inner peripheral surface of the peripheral wall section of the yoke, as in a case where the grooves are provided in the outer peripheral surface of the cylindrical rubber magnet.

DETAILED DESCRIPTION OF PREFERRED EMBODIMENTS

Figure 1:
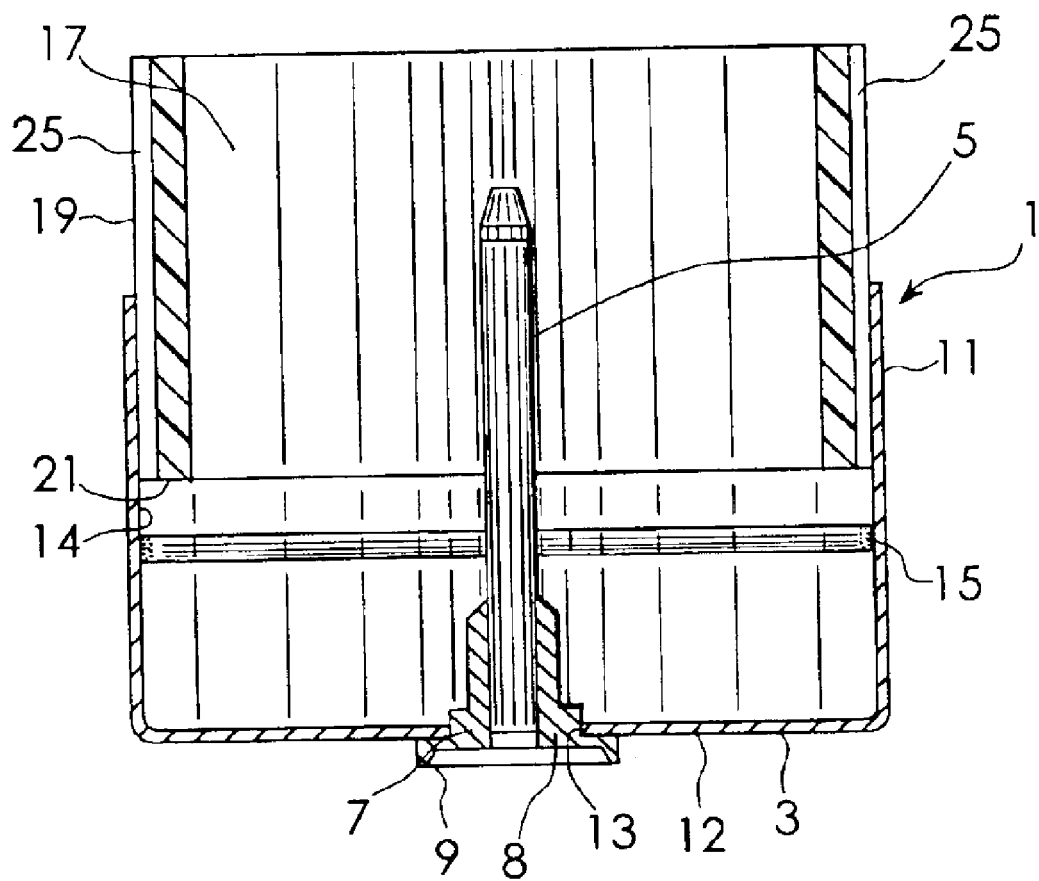
FIG. 1 is a vertical sectional view of a magnet rotor for a brushless motor in a manufacturing step of the magnet rotor using a joining method according to the present invention.
Figure 2A:
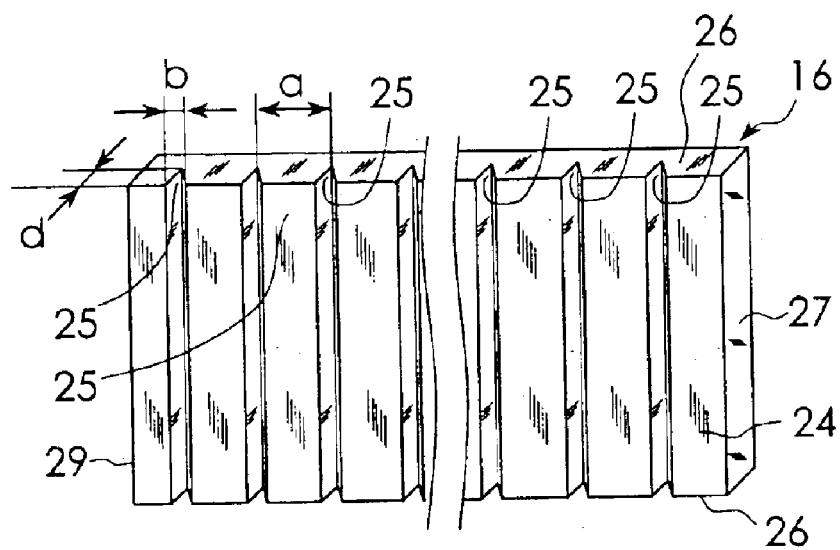
FIG. 2A is a partial perspective view of a rubber magnet used in the joining method according to the present invention.
Figure 2B:
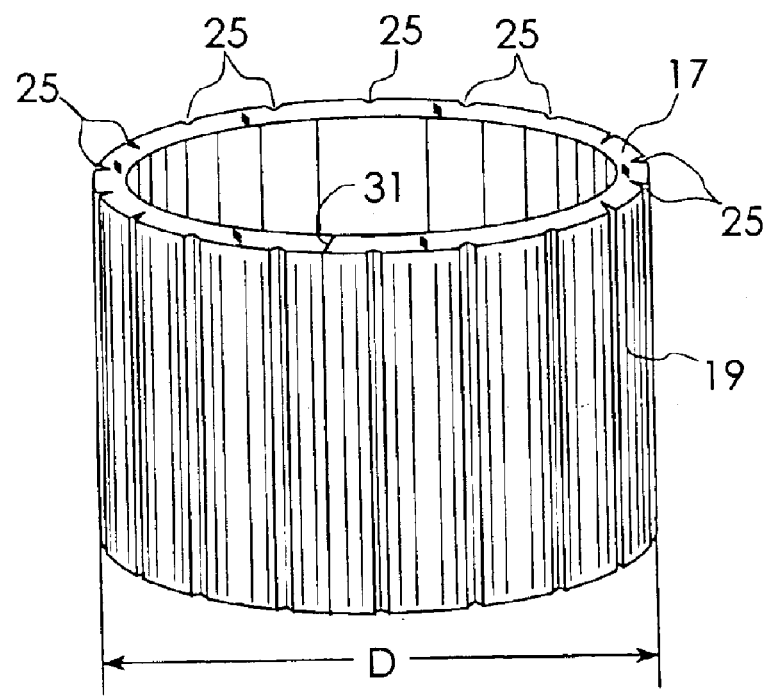
FIG. 2B is a perspective view of a cylindrical rubber magnet used in the joining method according to the present invention.
Figure 3A:
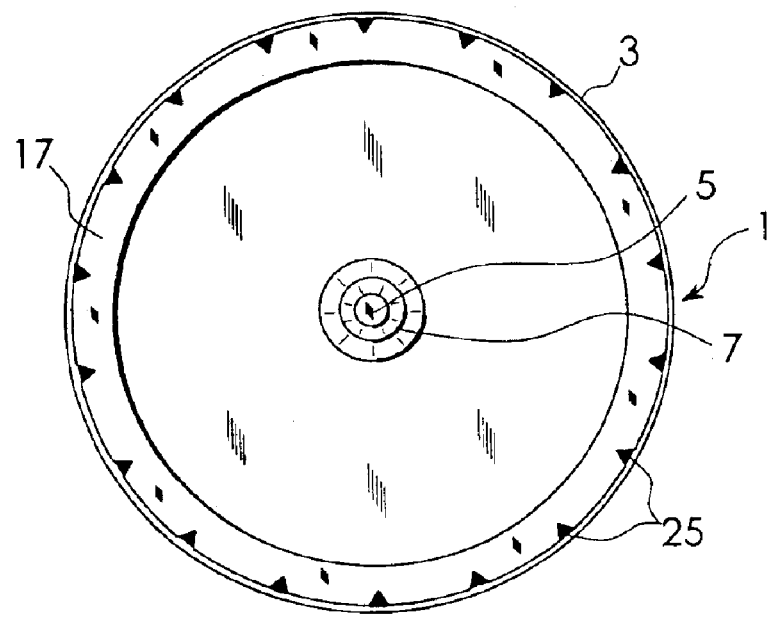
FIG. 3A is a top plan view of the magnet rotor manufactured according to the joining method of the present invention, seen from a direction in which a rotating shaft extends.
Figure 3B:
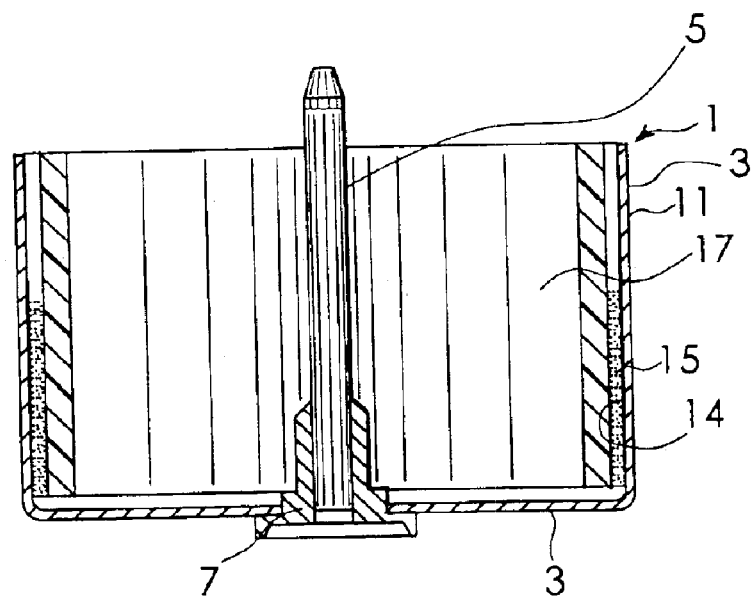
FIG. 3B is a vertical sectional view of the magnet rotor manufactured according to the joining method of the present invention.

Some embodiments of the present invention will be described in detail with reference to attached drawings. FIG. 1 shows a vertical section of a magnet rotor for a brushless motor in a manufacturing step of the magnet rotor using a joining method according to the present invention. FIGS. 2A and 2B are a partial perspective view of a rubber magnet and a perspective view of a cylindrical rubber magnet, both used in the joining method of the present invention, respectively. FIGS. 3A and 3B are a top plan view of the magnet rotor manufactured according to the method of the present invention, seen from a direction in which a rotating shaft of the magnet rotor extends, and the vertical section of the magnet rotor manufactured according to the method of the present invention.

A magnet rotor 1 is constituted from a cup-like yoke 3, a rotating shaft 5, and a bracket 7 for securing the rotating shaft 5 to the yoke 3. The cup-shaped yoke 3 is constituted from a cylindrical peripheral wall section 11 and a disc-shaped bottom wall section 12 integral with the peripheral wall section 11 so as to close an end of the peripheral wall section 11. A through hole 13 is formed at a center of the bottom wall section 12. The bracket 7 is fitted in to the through hole 13 for securing the rotating shaft 5 to the yoke 3. The bracket 7 is constituted from a bracket body 8 having at its center a through hole into which the end of the rotating shaft 5 is fitted and a ring-shaped flange section 9 integral with the end of the bracket body 8. An outer peripheral surface 19 of a cylindrical rubber magnet 17 is joined to an inner peripheral surface 14 of the peripheral wall section 11 of the yoke 3. The cylindrical rubber magnet 17 is formed by rolling a plate-like rubber magnet 16 with a plurality of grooves 25 formed therein, shown in FIG. 2A, into a cylindrical shape.

As shown in FIGS. 2A and 2B, a plurality of grooves 25 each having a V-shaped cross section are formed in a surface of the plate-like or sheet-like rubber magnet 16 at predetermined intervals in a longitudinal direction of the plate-like rubber magnet 16. The grooves 25 extend in a width direction perpendicular to the longitudinal direction and a thickness direction of the plate-like rubber magnet 16. The grooves 25 are open on a surface 24 of the plate-like rubber magnet 16 and at opposed ends 26 of the plate-like rubber magnet 16 in the width direction. As shown in FIG. 2B, where the plate-like rubber magnet 16 is rolled to form the cylindrical rubber magnet 17, the grooves 25 extend in the outer peripheral surface 19 in a direction in which the cylindrical rubber magnet 17 is inserted into the yoke 3 and open on both ends of the direction of insertion and are also open outwardly in a radial direction of the cylindrical rubber magnet 17.

A size of the plate-like rubber magnet 16 in the longitudinal direction is determined so that a diameter D, shown in FIG. 2B, of the outer peripheral surface 19 of the cylindrical rubber magnet 17 matches an inner diameter of the cylindrical peripheral wall section 11 of the yoke 3 or is slightly larger than the inner diameter of the yoke 3. With this arrangement, the cylindrical rubber magnet 17 is inserted into the yoke 3 with a very small gap formed there between.

A width of the V-shaped grooves 25, indicated by b in FIG. 2A, a depth of the V-shaped grooves 25, indicated by d in FIG. 2A, and an interval between the grooves adjacent to each other, indicated by a in FIG. 2A are determined so that the adhesive is not pushed out of the lower end surface 21 of the cylindrical rubber magnet 17 as described before, but readily gets into the grooves 25, and that an adhesive 15 located between the adjacent grooves also readily gets into the grooves 25.

In this embodiment, the interval a between the adjacent grooves among the grooves 25 is determined to be substantially the same. The plate-like rubber magnet 16 is formed so that even when two end surfaces 27 and 29 located on both sides of the plate-like rubber magnet 16 in the longitudinal direction are joined together, the interval between the adjacent grooves on both sides of a seam 31 formed by abutting the end surfaces 27 and 29 is also the same as the interval a. The interval a between the adjacent grooves, the opening width b of the opening of each of the grooves 25 on a side of the surface 24, and the depth d of each of the grooves 25 are set so that the adhesive 15 located between the adjacent grooves readily gets into the grooves 25 when the outer peripheral surface 19 of the cylindrical rubber magnet 17 is slid over the inner peripheral surface 14 of the yoke 3. Preferably, the interval a between the grooves adjacent to each other is set in a range of 5% to 20% of the diameter D of the outer peripheral surface 19 of the cylindrical rubber magnet 17, the width b of each of the grooves 25 is set in a range of 20% to 40% of the interval length a, and the depth d of each of the grooves 25 is set in a range of 5% to 15% of the interval a. Setting these dimensions a, b, and c within the respective ranges described above ensures that the adhesive gets into the grooves 25. If these dimensions a, b, and c are set too large, a capacity of an inside space of each of the grooves 25 becomes too large, resulting in a reduced suction force or surface tension for the adhesive. For this reason, the adhesive 15 does not get into the grooves 25 so much. Conversely, if these dimensions a, b, and c are set too small, the grooves 25 substantially becomes mere gaps which are the same as the ones for conventional grooves. Thus, not only the suction force or surface tension for the adhesive is reduced, but also an amount of the adhesive interposed between the inner peripheral surface 14 of the yoke 3 and the outer peripheral surface 19 of the cylindrical rubber magnet 17 is reduced. Adhesion strength is thereby reduced.

The grooves 25 may be formed by cutting. They may also be formed simultaneously with formation of the plate-like rubber magnet 16; and when the simultaneous formation is performed, the grooves 25 may be formed using an arbitrary method.

A method of joining the peripheral wall section 11 of the cylindrical rubber magnet 17 to the inner peripheral surface 14 of the yoke 3 will be described with reference to FIG. 1. First, the adhesive 15 is applied to the inner peripheral surface 14 of the cylindrical peripheral wall section 11 of the yoke 3. An epoxy thermosetting adhesive is employed as the adhesive 15. The adhesive 15 is continuously applied to a middle region of the inner peripheral surface 14 in a peripheral direction.

Next, the long, thin, and plate-like rubber magnet 16 is rolled into a cylindrical shape, thereby forming the cylindrical rubber magnet 17. Then, the cylindrical rubber magnet 17 is inserted into the inner peripheral surface 14 of the peripheral wall section 11 of the yoke 3 to a predetermined position, by sliding its outer peripheral surface 19 over the inner peripheral surface 14 of the peripheral wall section 11 of the yoke 3. Thereafter, the adhesive 15 is heated and cured, thereby completing the manufacturing of the magnet rotor.

On the other hand, the adhesive 15 is applied to a substantially central circumference portion of the inner peripheral surface 14 of the cylindrical peripheral wall section 11 in an axial direction of the rotating shaft 5. Next, the outer peripheral surface 19 of the cylindrical rubber magnet 17 formed by rolling the plate-like rubber magnet 16 into the cylindrical shape is slid over and inserted into the inner peripheral surface 14 of the cylindrical wall section 11, to which the adhesive 15 has been applied. During this process, most of the adhesive 15 readily gets into the grooves 25 without being pushed out of the lower end surface 21 of the cylindrical rubber magnet 17. The adhesive 15 located between the adjacent grooves also readily gets into the grooves 25. As a result, as shown in FIG. 3B, the adhesive gets into a gap between the cylindrical rubber magnet 17 and the cylindrical peripheral wall section 11. High adhesion strength can be thereby attained. FIG. 3B shows a state of the adhesive that has got into the gap between the yoke 3 and an approximately lower half of a height of the cylindrical rubber magnet 17. An entry level of the adhesive is determined from the amount of the adhesive 15 applied to the inner peripheral surface 14 of the cylindrical peripheral wall section 11. If the amount of the applied adhesive is increased, the entry level of the adhesive can be made higher than is illustrated. However, an amount of the adhesive to be used would increase.

Generally, the direction of insertion of the cylindrical rubber magnet 17 is the same as the axial direction of the rotating shaft 5. These directions do not need to be exactly the same. When the cylindrical rubber magnet 17 is inserted into the yoke by skewing or turning slightly one of the cylindrical rubber magnet and yoke relative to the other, a similar effect can be obtained, provided that skewing is at an appropriate level.

The grooves 25 do not need to extend in completely parallel with the direction of insertion of the cylindrical rubber magnet 17. The grooves 25 may be so slanted that the adhesive can get thereinto.

Thus, the embodiment was explained, taking an example of manufacturing the magnet rotor used for the brushless motor to be used as a fan motor. The method of the present invention, however, is not limited to the case described above, and can be used for other apparatuses in which a rubber magnet is joined to a yoke having a peripheral wall section.

In the embodiment described above, the adhesive 15 is continuously applied to the middle region of the inner peripheral surface 14 of the cylindrical peripheral wall section 11 in the peripheral direction. The adhesive 15 may also be discontinuously applied in the peripheral direction.

Figure 4A:
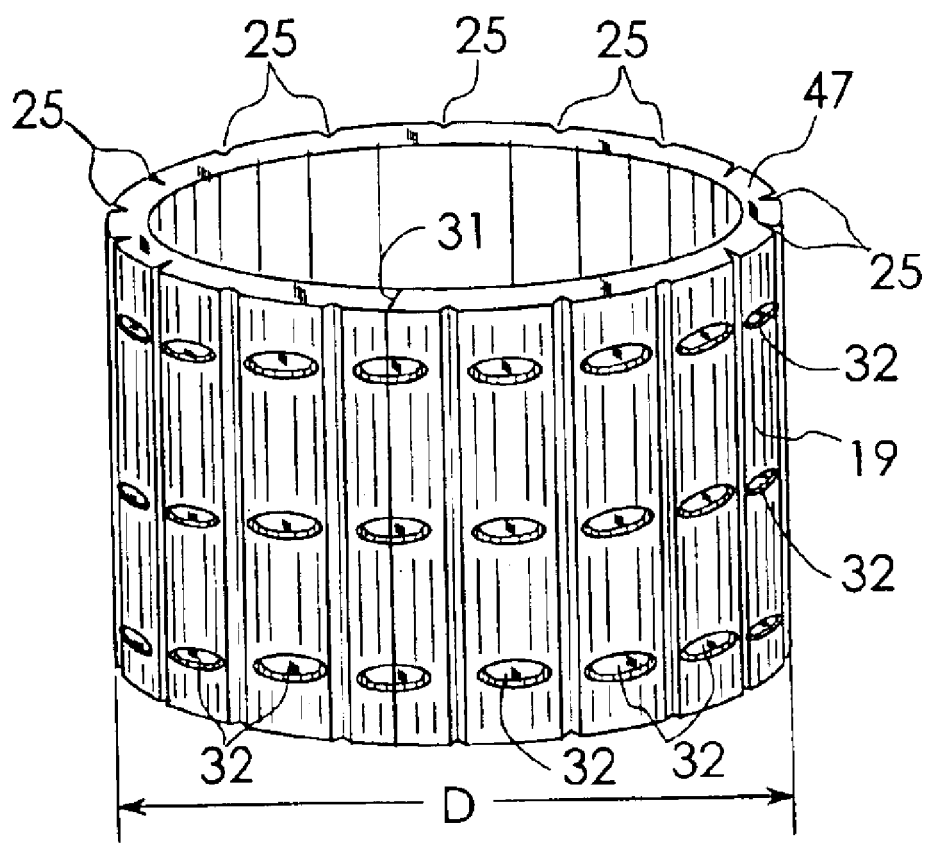
FIG. 4A is a perspective view showing a variation of the cylindrical rubber magnet.

FIG. 4A shows a perspective view of a cylindrical rubber magnet 47 that can be used when the method according to the present invention is carried out. In this embodiment, a plurality of recesses 32, which are open outwardly in the radial direction of the cylindrical rubber magnet 47, are formed in a dispersed state, in addition to the grooves 25 formed in the surface of the cylindrical rubber magnet 47. With this arrangement, the adhesive between the inner peripheral surface of the peripheral wall section of the yoke and regions other than the grooves 25 on the outer peripheral surface of the cylindrical rubber magnet 47 will stay in the recesses 32. Thus, in these regions as well, the cylindrical rubber magnet 47 can be securely joined to the yoke.

Figure 4B:
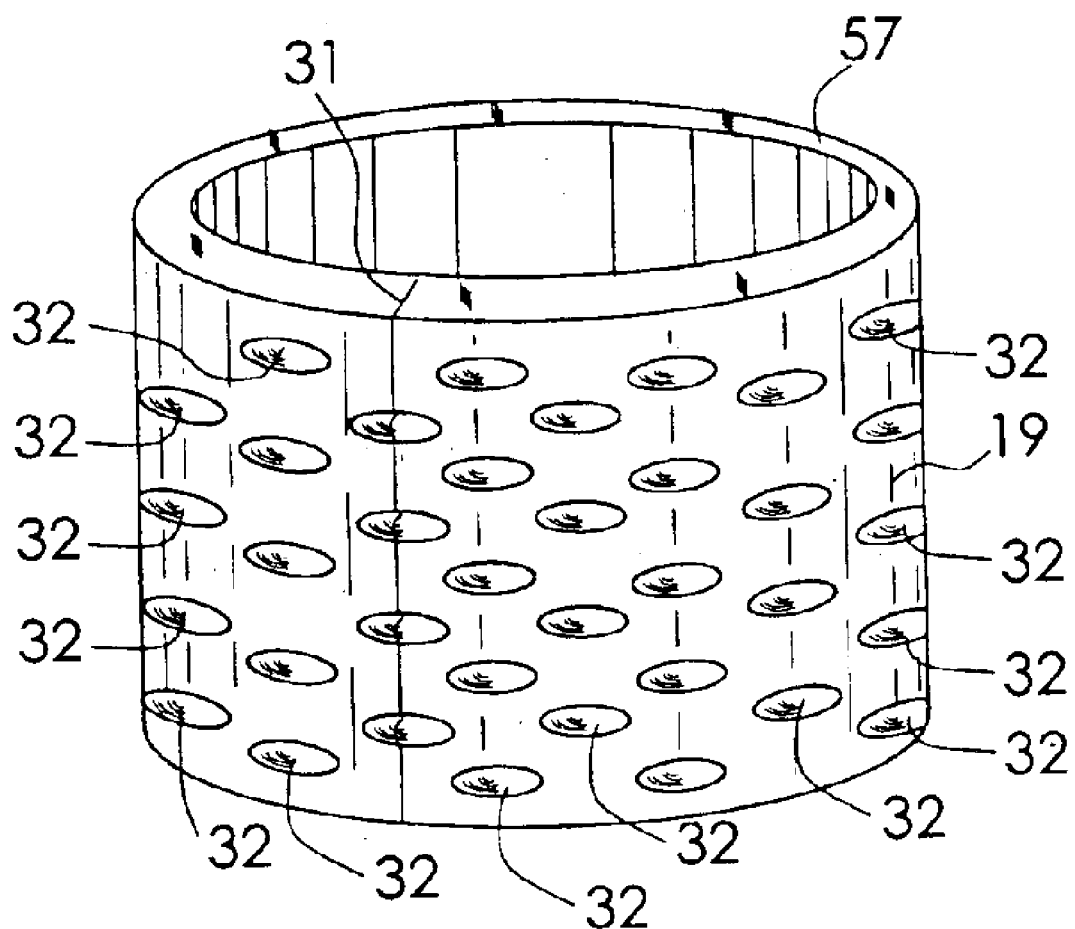
FIG. 4B is a perspective view showing another variation of the cylindrical rubber magnet.

FIG. 4B is a perspective view of another cylindrical rubber magnet 57 that utilizes the same idea employed in FIG. 4A. In this embodiment, a plurality of curved recesses 32, commonly referred to as dimples, which are open outwardly in the radial direction of the cylindrical rubber magnet 57, are formed in the outer peripheral surface 19 of the cylindrical rubber magnet 57 in the dispersed state. Also in this case, if an appropriate-sized gap is formed between the outer peripheral surface 19 of the cylindrical, rubber magnet 57 and the inner peripheral surface of the yoke, the adhesive gets into the gap and stays in the curved recesses 32 at appropriate locations. For this reason, a predetermined amount of the adhesive can be dispersed inside the gap, thereby enabling enhancement of a joining effect.

Figure 4C:
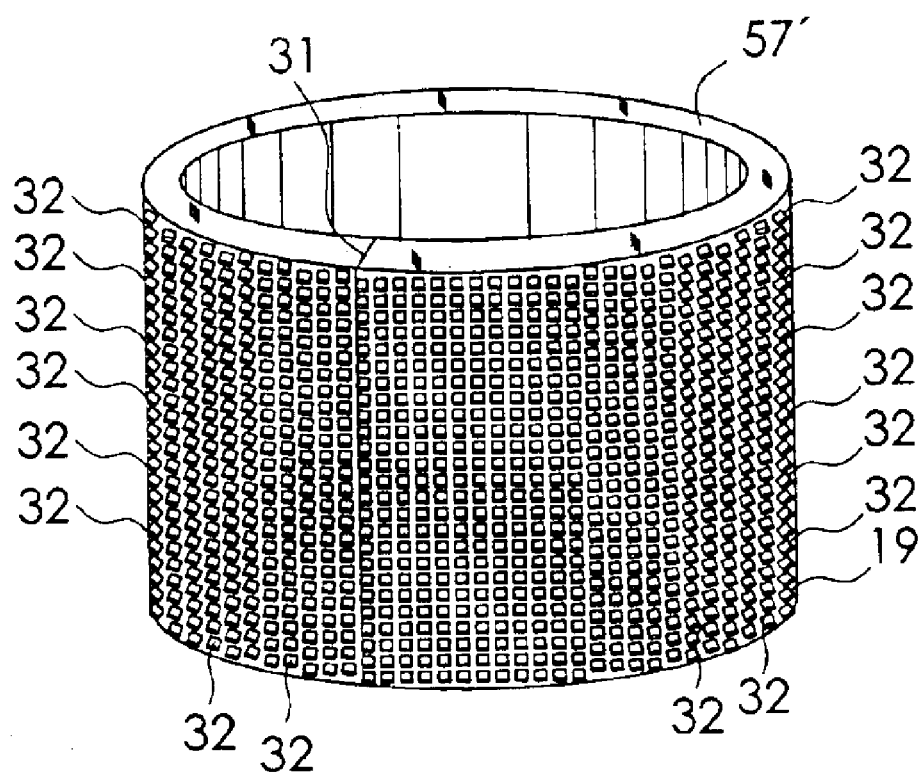
FIG. 4C is a perspective view showing still another variation of the cylindrical rubber magnet.
Figure 5A:
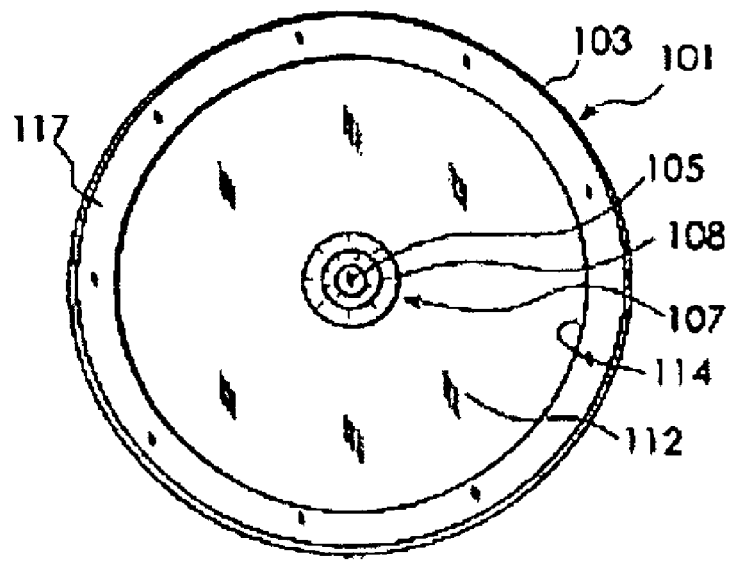
FIG. 5A is a top plan view of a magnet rotor seen from the axial direction of a rotating shaft, manufactured using a conventional joining method.
Figure 5B:
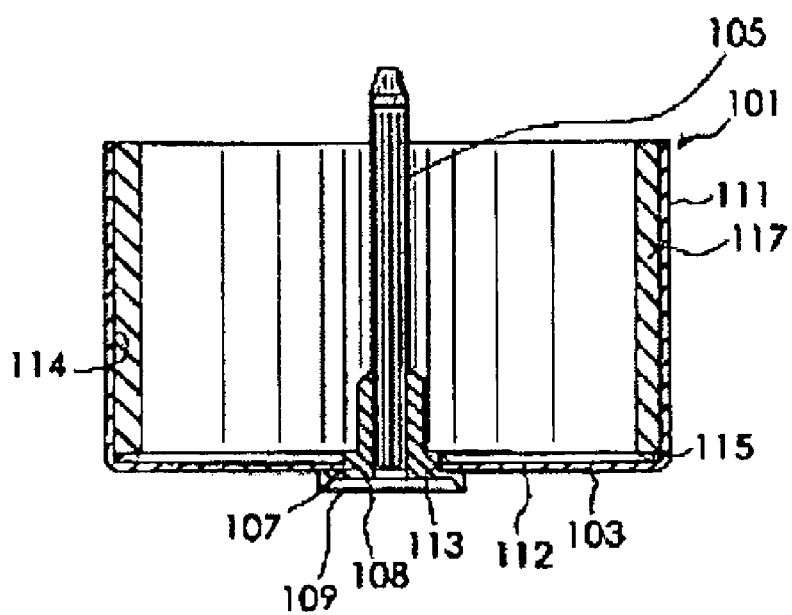
FIG. 5B is a vertical sectional view of the magnet rotor.
Figure 6:
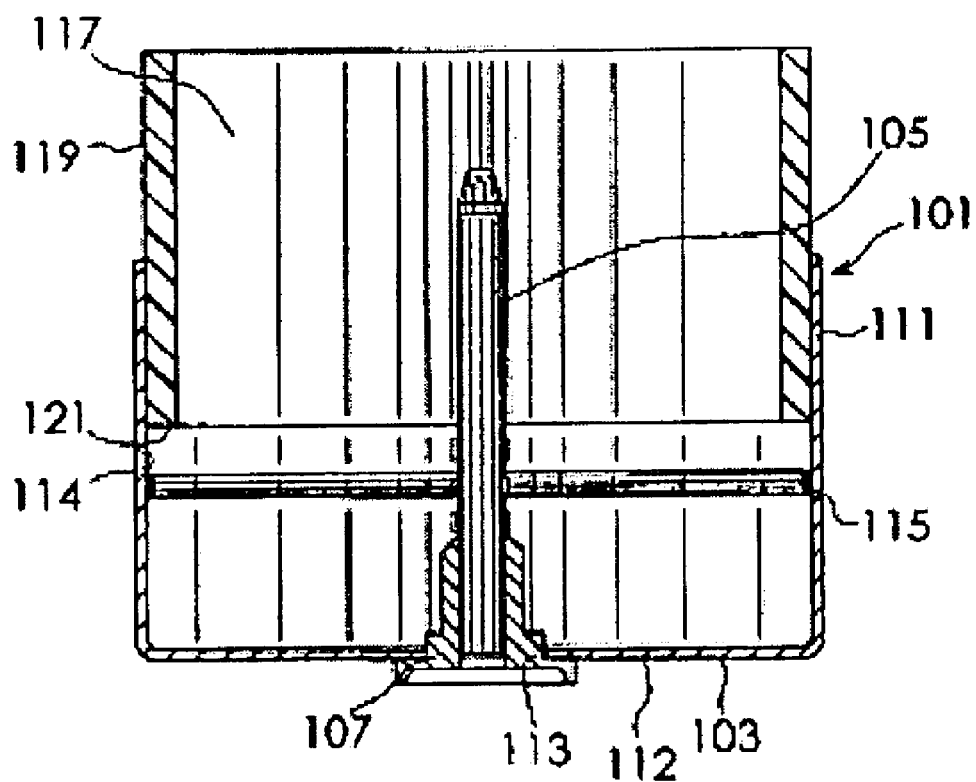
FIG. 6 is a vertical sectional view of the magnet rotor, used for explaining the manufacturing step of the magnet rotor using the conventional joining method.

FIG. 4C is a perspective view of still another cylindrical rubber magnet 57' formed with the same idea as in FIG. 4B. In this embodiment, the shape, the size, and, a number of the recesses 32 are different from the recesses in the cylindrical rubber magnet 57 as shown in FIG. 4B. In this cylindrical rubber magnet 57', an area of the opening of each of the recesses 32 is reduced, and the interval between the recesses adjacent to each other is also reduced so as to allow entry of the adhesive to the highest possible height of the cylindrical rubber magnet 57'. It is confirmed by experiment that if the area of the opening of each of the recesses 32 is set in a range of 0.5 mm$^2$ to 1.5 mm$^2$ and the interval between the recesses adjacent to each other is set in a range of 1.5 mm to 3 mm, a necessary and sufficient adhesion strength can be obtained even if the grooves described before are not provided for the cylindrical rubber magnet 57'.

In the embodiment shown in FIGS. 1, 2A, 2B, 3A, and 3B, a description was directed to the case where each of the grooves 25 has the V-shaped cross section. The cross section of each of the grooves 25 is not limited to a V shape. The grooves 25 each with a U-shaped cross section or a sawtooth-shaped cross section can be employed. A bottom of the cross section may be rounded off. The cross section of each of the grooves 25 may be rectangular. Further, the grooves of two or more types having differently-shaped cross sections may be employed. In the above embodiments, while the interval a between the adjacent grooves is set to be substantially fixed, there may be variations in the interval length. In the above embodiments, a plurality of grooves are provided in the surface of the rubber magnet adhered onto the yoke. For this reason, when the rubber magnet is adhered onto the yoke, the adhesive readily spreads out between the rubber magnet and the yoke, and the high adhesion strength between the rubber magnet and the yoke can be obtained. Accordingly, even if the rubber magnet with a strong magnetic force is employed, stable motor performance can be achieved over a long period.

Further, the present invention is not limited to these embodiments, but various variations and modifications may be made without departing from the scope of the present invention.

What is claimed is:

1. A method of joining a rubber magnet to a yoke comprising the steps of:

applying an adhesive to an inner peripheral surface of a cylindrical peripheral wall section of said yoke;

forming a cylindrical rubber magnet by rolling a plate-like rubber magnet into a cylindrical shape; and inserting said cylindrical rubber magnet into said yoke to join said cylindrical rubber magnet to said inner peripheral surface of said yoke by sliding an outer peripheral surface of said cylindrical rubber magnet over said inner peripheral surface of said peripheral wall section;

wherein said cylindrical rubber magnet has a plurality of grooves formed in said outer peripheral surface at predetermined intervals in a peripheral direction of said cylindrical rubber magnet, said grooves extending in said outer peripheral surface in a direction in which said cylindrical rubber magnet is inserted into said yoke and being open on both ends of the direction of insertion and being also open outwardly in a radial direction of said cylindrical rubber magnet.

2. The method of joining a rubber magnet to a yoke as defined in claim 1, wherein said adhesive is continuously or discontinuously applied to a middle region of said inner peripheral surface in said peripheral direction; and an interval between adjacent two of said plurality of grooves and a cross sectional shape of each of said grooves are set so that, while said outer peripheral surface of said cylindrical rubber magnet is being slid over said inner peripheral surface of said yoke, said adhesive located between said adjacent grooves gets into the adjacent grooves.

3. The method of joining a rubber magnet to a yoke as defined in claim 2, wherein said interval is set in a range of 5% to 20% of a diameter of said outer peripheral surface of said cylindrical rubber magnet; and said cross sectional shape is a V shape.

4. The method of joining a rubber magnet to a yoke as defined in claim 1, wherein a plurality of recesses are formed in said outer peripheral surface of said cylindrical rubber magnet in addition to said grooves, said plurality of recesses being open outwardly in the radial direction.

5. A method of joining a rubber magnet to a yoke comprising the steps of:

applying an adhesive to an inner peripheral surface of a cylindrical peripheral wall section of said yoke;

forming a cylindrical rubber magnet by rolling a plate-like rubber magnet into a cylindrical shape; and inserting said cylindrical rubber magnet into said yoke to join said cylindrical rubber magnet to said inner peripheral surface of said yoke, by sliding an outer peripheral surface of said cylindrical rubber magnet over said inner peripheral surface of said peripheral wall section;

wherein said cylindrical rubber magnet has a plurality of recesses formed in said outer peripheral surface of said cylindrical rubber magnet in a dispersed state, said plurality of recesses being open outwardly in a radial direction of said cylindrical rubber magnet.

6. The method of joining a rubber magnet to a yoke as defined in claim 5, wherein an area of an opening of each of said plurality of recesses and an interval between adjacent two of said plurality of recesses are set so that said adhesive can get into a gap between said outer peripheral surface of said cylindrical rubber magnet and said inner peripheral surface of said peripheral wall section of said yoke and can also get into said recesses progressively one after another.

7. The method of joining a rubber magnet to a yoke as defined in claim 6, wherein said area of the opening is set in a range of 0.5 mm$^2$ to 1.5 mm$^2$, and said interval between the adjacent recesses is set in a range of 1.5 mm to 3 mm.

* * * * *

UNITED STATES PATENT AND TRADEMARK OFFICE
CERTIFICATE OF CORRECTION

PATENT NO. : 6,944,929 B2
DATED : September 20, 2005
INVENTOR(S) : Ogawa et al.

It is certified that error appears in the above-identified patent and that said Letters Patent is hereby corrected as shown below:

Title page,
Item [75], Inventors, delete "Ookubo" and insert -- Ohkubo --.

Signed and Sealed this

Seventh Day of February, 2006

JON W. DUDAS
*Director of the United States Patent and Trademark Office*

UNITED STATES PATENT AND TRADEMARK OFFICE
CERTIFICATE OF CORRECTION

PATENT NO. : 6,944,929 B2
DATED : September 20, 2005
INVENTOR(S) : Ogawa et al.

It is certified that error appears in the above-identified patent and that said Letters Patent is hereby corrected as shown below:

Title page,
Item [75], Inventors, delete "Ookubo" and insert -- Ohkubo --.

Signed and Sealed this

Eleventh Day of April, 2006

JON W. DUDAS
*Director of the United States Patent and Trademark Office*